US006240188B1

(12) United States Patent
Dondeti et al.

(10) Patent No.: US 6,240,188 B1
(45) Date of Patent: May 29, 2001

(54) DISTRIBUTED GROUP KEY MANAGEMENT SCHEME FOR SECURE MANY-TO-MANY COMMUNICATION

(75) Inventors: Lakshminath R. Dondeti, Lincoln, NE (US); Sarit Mukherjee, Mount Laurel, NJ (US); Ashok Samal, Lincoln, NE (US)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 09/439,426

(22) Filed: Nov. 11, 1999

Related U.S. Application Data (60) Provisional application No. 60/142,490, filed on Jul. 6, 1999.

(51) Int. Cl.[7] ....................................................... H04K 1/00
(52) U.S. Cl. ........................... 380/284; 380/259; 380/260; 380/278; 380/283; 380/284; 380/28; 380/30; 713/150; 713/162; 713/185; 705/50; 705/51; 705/60; 705/71
(58) Field of Search .................................... 380/255, 259, 380/260, 277, 278, 283, 284, 285, 286, 28, 30; 705/50, 51, 64, 71; 713/150, 162, 163

(56) References Cited

U.S. PATENT DOCUMENTS

| | | | |
|---|---|---|---|
| 5,036,518 | * 7/1991 | Tseung | 371/32 |
| 5,109,384 | * 4/1992 | Tseung | 371/32 |
| 5,592,552 | * 1/1997 | Fiat | 380/21 |
| 5,748,736 | * 5/1998 | Mittra | 380/21 |
| 5,831,975 | * 11/1998 | Chen et al. | 370/256 |
| 6,049,878 | * 4/2000 | Caronni et al. | 713/201 |

OTHER PUBLICATIONS

Isabella Chang, et al. "Key Management for Secure Internet Multicast using Boolean Function Minimization Techniques", IBM T.J. Watson Research Center.

Suvo Mittra, "Iolus: A Framework for Scalable Secure Multicasting", Computer Science Department, Stanford University.

Chung Kei Wong, "Secure Group Communications Using Key Graphs*", Department of Computer Sciences, The University of Texas at Austin, TR–97–23, Jul. 28, 1997, pp. 1–27.

Ohad Rodeh, Ken Birman, Danny Dolev, "Optimized Group Rekey for Group Communication systems", Jul. 19, 1999, pp. 1–20.

Marcel Waldvogel, et al., "The VersaKey Framework: Versatile Group Key Management", IEEE Journal on Selected Areas in Communications, vol. 17, No. 8, Aug. 1999, pp. 1–15.

* cited by examiner

Primary Examiner—Tod Swann
Assistant Examiner—Paul E. Callahan
(74) Attorney, Agent, or Firm—Harness, Dickey & Pierce, P.L.C.

(57) ABSTRACT

A group key management system and method for providing secure many-to-many communication is presented. The system employs a binary distribution tree structure. The binary tree includes a first internal node having a first branch and a second branch depending therefrom. Each of the branches includes a first member assigned to a corresponding leaf node. The first member has a unique binary ID that is associated with the corresponding leaf node to which the first member is assigned. A first secret key of the first member is operable for encrypting data to be sent to other members. The first member is associated with a key association group that is comprised of other members. The other members have blinded keys. A blinded key derived from the first secret key of the first member is transmitted to the key association group. Wherein, the first member uses the blinded keys received from the key association group and the first secret key to calculate an unblinded key of the first internal node. The unblinded key is used for encrypting data that is communicated between members located on branches depending from the first internal node.

29 Claims, 8 Drawing Sheets

DISTRIBUTED GROUP KEY MANAGEMENT SCHEME FOR SECURE MANY-TO-MANY COMMUNICATION

CROSS REFERENCE TO RELATED APPLICATIONS

This application claims the benefit of the filing date of U.S. provisional application No. 60/142,490 filed Jul. 6, 1999.

BACKGROUND AND SUMMARY OF THE INVENTION

The present invention relates generally to secure communication. More particularly, the invention relates to a system for providing secure communication between many senders and many members.

Secure multicasting over a network such as the Internet is employed in several applications, such as stock quote distribution, private conferencing, and distributed interactive simulation. Some of these applications have a single sender distributing secret data to a large number of users while the others have a large number of users communicating privately with each other. Several approaches have been proposed in the recent past to support group communication between one sender and many members. The few solutions that exist to facilitate secure communication between many senders and many members suffer from a common failing; they employ some form of centralized group control.

Multicasting is a scalable solution to group communication; many-to-many secure multicasting protocols must also be scalable. Group access control, secret key distribution and dynamic group management are three major components of a secure group communication protocol. Most of the existing one-to-many secure multicast protocols use a centralized entity, the group manager to enforce access control and distribute secret keys. When the multicast group membership is dynamic, the group manager must also maintain perfect forward secrecy. This is to guarantee that members cannot decrypt secret data sent before they join the group and the data sent after they left. The group manager changes the appropriate secret keys when a member joins or leaves, and distributes them to the corresponding members. The rekeying process must be scalable; the key distribution overhead should be independent of the size of the multicast group.

Although it presents a single point of attack and failure, using a centralized entity for group control is natural for one-to-many secure multicasting. However, in the presence of multiple senders, it is desirable that the multicast group remains operational as long as at least one sender is operational. In other words, many-to-many secure multicasting calls for decentralized control of the group. Access control, key distribution and dynamic group management tasks should be delegated to all the senders. It is desirable to evenly distribute access control responsibilities and protocol processing overhead among all the senders in the group.

Only a few secure many-to-many group communication protocols exist in the literature. However, all such protocols in the literature use centralized group control and thus are prone to single point of attack as well as failure. One protocol exposes secret keys to third party entities which assist in key distribution and additionally employs a centralized "group security controller" (GSC) for group management. Another protocol suggests placing equal trust in all the group members. Members joining early generate the keys and distribute them to the members joining late. While this protocol works in principle, it is susceptible to collusion amongst the members. It is possible to have a very small subset of members controlling the group, allowing uneven distribution of group control and key distribution overhead. It is desirable for the structure of a communication protocol to prevent collusion between group members.

Any secure group communication protocol has three major components, group access control, secret key distribution and dynamic group management. Senders are responsible for controlling access to the secure multicast group. All members' authentication must be verified before they can join the group. Data is encrypted for privacy reasons before being sent to the group. The senders are responsible for distributing the data encryption keys to members in a secure and scalable fashion. Finally, the senders are responsible for maintaining perfect forward secrecy. To ensure perfect forward secrecy, sender(s) should change secret keys when a host joins or leaves the group. This rekeying process should be secure as well as scalable.

The requirements and desirable characteristics of a secure many-to-many protocol are as follows. A secure group communication scheme must be scalable. More specifically, key distribution overhead must be scalable as the number of members (or senders) in the group increases. All senders must be trusted equally and the group must be operational if at least one sender is operational. It is desirable to distribute access control and dynamic group management tasks to all senders. This allows the joins and leaves to be processed locally, thus avoiding global flooding of control traffic. Distribution of group management tasks also avoids performance bottlenecks and eliminates single points of attack in a multicast group. Finally, the protocol should be able to avoid or detect and eliminate any colluding members or senders efficiently.

The present invention presents a group key management system and method for providing secure many-to-many communication. The system employs a binary distribution tree structure. The binary tree includes a first internal node having a first branch and a second branch depending therefrom. Each of the branches includes a first member assigned to a corresponding leaf node. The first member has a unique binary ID that is associated with the corresponding leaf node to which the first member is assigned. A first secret key of the first member is operable for encrypting data to be sent to other members. The first member is associated with a key association group that is comprised of other members. The other members have blinded keys. A blinded key derived from the first secret key of the first member is transmitted to the key association group. Wherein, the first member uses the blinded keys received from the key association group and the first secret key to calculate an unblinded key of the first internal node. The unblinded key is used for encrypting data that is communicated between members located on branches depending from the first internal node.

For a more complete understanding of the invention, its objectives and advantages, refer to the following specification and to the accompanying drawings.

DESCRIPTION OF THE PREFERRED EMBODIMENTS

Figure 1:
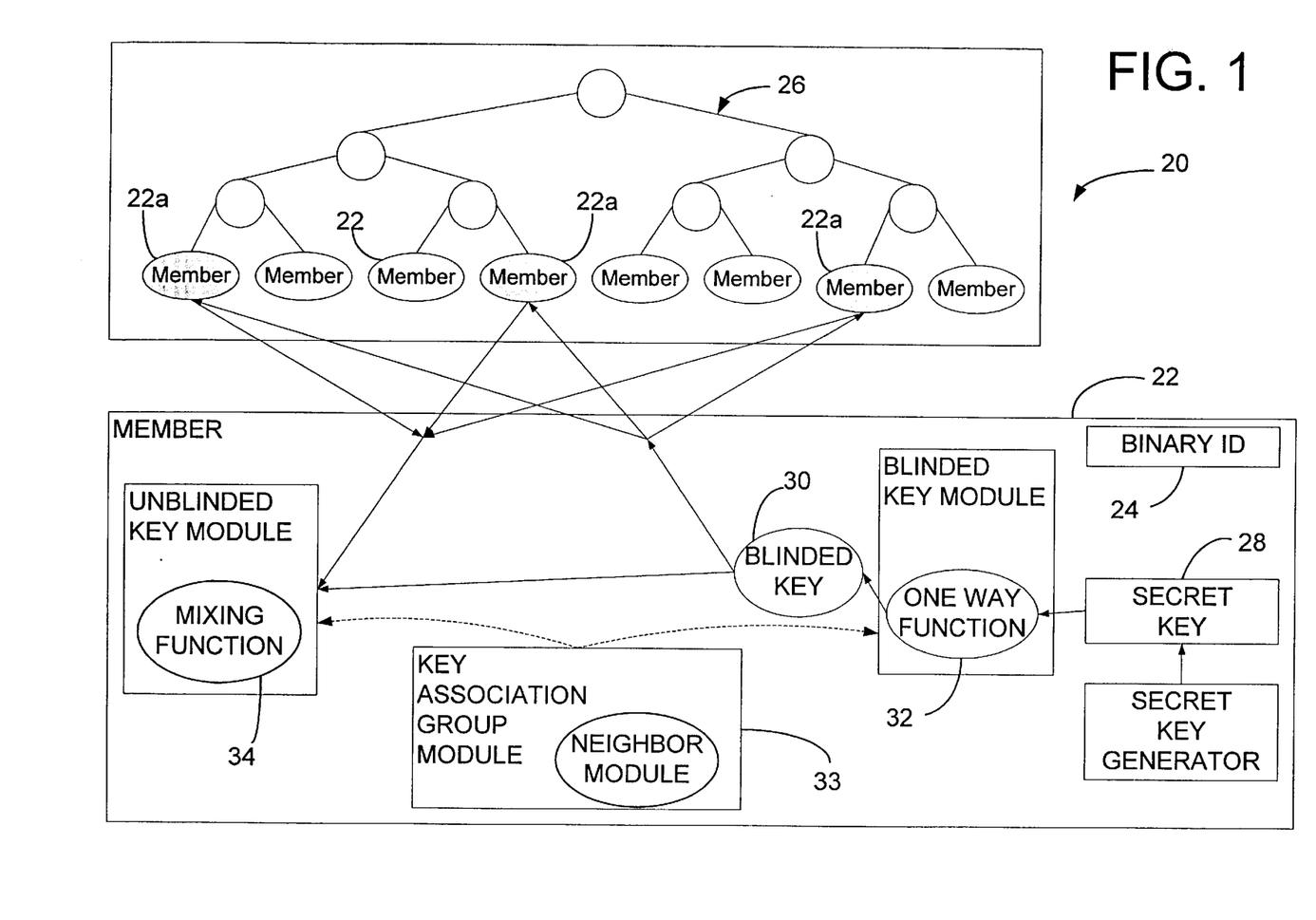
FIG. 1 is a diagram illustrating a communication system for many to many communication among members of a communication group.

Referring to FIG. 1, a scalable, secure multicasting protocol that supports many-to-many communication according to the principles of the present invention is illustrated. The present embodiment of the invention is a communication system 20 employing a distributed tree-based key management scheme (DTKM) for secure many-to-many group communication. The system 20 is scalable and members 22 are trusted equally. The system 20 delegates group control responsibilities and key distribution tasks evenly to the members.

Each member 22 is assigned a binary ID and these IDs are used to define key associations for each member 22. Members in the key association groups 22a are contacted to report membership changes and to exchange keys. The members 22 are trusted equally and all of them may be senders. Prospective members may contact any active member to join the group. Active members verify new members' credentials and assign them a unique binary ID 24. The ID assignment is done locally without any need to lookup a global space of IDs. The ID assignment process illustrates the distributed nature of the protocol. The new member initiates the rekeying process. Note that rekeying is done to ensure perfect forward secrecy. Leaves are processed similar to joins; the neighbor (neighbors are determined based on IDs) of the departing host is required to notice the departure and initiate the rekeying process. Key associations help delegate key distribution overhead evenly among all the members of the group.

Members are represented by the leaves of a binary key distribution tree 26. Each member 22 generates a unique secret key 28 for itself and each internal node key is computed as a function of the secret keys of its two children. All secret keys 28 are associated with their blinded versions 30, which are computed using a one-way function 32. Each member 22 holds all the unblinded keys of nodes that are in its path to the root and the blinded keys of nodes that are siblings of the nodes in its path to the root. The contribution of the unique secret key toward the computation of the root key gives each member 22 partial control over the group. A join/leave requires only the keys in the path to the root from the joining/departing host to be changed. Thus, each membership change necessitates only O(log n) messages where n is the number of members in the group. Thus the protocol is scalable.

Members of the multicast group are represented by leaf nodes of a key distribution tree. The key distribution tree is strictly binary, i.e., each internal node has exactly two children. Each member generates a unique secret key 28 which is the member's contribution towards the generation of the internal node keys including the root key. Internal nodes are associated with secret keys and these keys are computed as a function of their children's keys. The root key is computed similarly and is used for data encryption. For each secret key, k, there is a blinded key, k', and an unblinded key. The blinded key is computed by applying a given one-way function to the secret key. Given a blinded key that is calculated with a one-way function, it is computationally infeasible to compute the unblinded counterpart of the blinded key. Each member 22 knows all the keys of the nodes in its path to the root of the tree and the blinded keys of siblings of the nodes in its path to the root of the tree and no other blinded or unblinded keys. The blinded keys are distributed by members that are owners and authorized distributors of those keys. Each member 22 computes the unblinded keys of the internal nodes of the tree in its path to the root and the root key itself, using the blinded keys it receives and its own secret key 28. A mixing function 34 is used to compute internal node keys from the blinded keys of the node's children.

Each node is assigned a binary ID 24 and is responsible for generating a secret key 28. The member 22 associated with the node also computes the blinded version 30 of its key 28 and shares it with its immediate neighbor in the key distribution tree 26. Table I provides psuedocode of a Find-Neighbor algorithm that takes a binary ID of node A and returns the binary ID of A's neighbor.

TABLE I

Find Neighbor Module

Find_Neighbor(X = $b_h b_{h-1} ... b_1$), X is a binary ID, where $b_i$ for $1 < i < h$, is a binary
    digit
begin
    X' = $b_h b_{h-1} ... \overline{b_1}$
    if(leaf_node(X') == "true")
        return X';
    else if (internal_node(X') == "true")
        do
            X' = X'0;
        while (leaf_node(X') == "false");
        return X'
end Notes:
1. leaf_node(X) returns true if X is a leaf node of the key distribution tree; false otherwise.
2. internal_node(X) returns true if X is an internal node of the key distribution tree; false otherwise.

Figure 2:
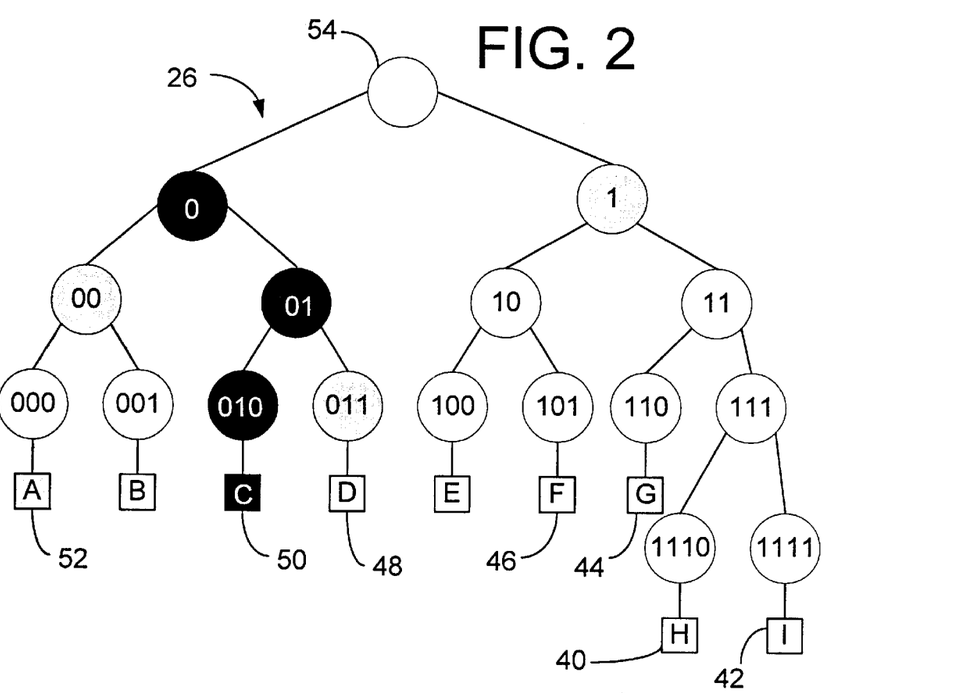
FIG. 2 is a diagram of a key distribution tree arranged in accordance with the principles of the present embodiment of the invention.

With reference to FIGS. 1 and 2, following the Find_neighbor algorithm; H(1 1 1 0)'s neighbor is I(1 1 1 1), and G(1 1 0)'s neighbor is H(1 1 1 0). Neighbors with IDs 24 of same length (H and I in FIG. 2) are referred to as immediate neighbors and they exchange blinded versions 30 of their secret keys 28 with each other. If a pair of neighbors have different ID lengths (G and H in FIG. 2), the member with the smaller ID size, sends the blinded version 30 of its secret key 28 and receives the blinded key 30 of the corresponding internal node of same ID length from the member with the larger ID length (G receives $k'_{111}$ from H). Using the new keys that are received, the members 22 compute their parent's secret key 28. A mixing function (typically an XOR function) 34 is used to compute internal node keys. For example in FIG. 2, C and D apply the mixing function, m, 34 to the blinded keys $k'_{010}$ and $k'_{011}$ to compute the internal node key $k_{01}$.

Blinded keys 30 are exchanged between members of a key association group 22a in the system 20. Key associations are designed to delegate the task of key distribution evenly among all the members 22. Each member 22 needs as many blinded keys 30 as the length of its ID 24, to compute the root key. Each blinded key 30 is supplied by a different member of its key association group 22a. For each bit position in a member's ID, there exists a member 22 that supplies the corresponding blinded key. The following module, Find_Key_Association 33, returns the ID 24 of the member 22 and the secret key 28 it supplies, corresponding to a given bit position in a member's ID.

TABLE II

Find Key Association Group Module

Find_Key_Association(X = $b_h b_{h-1} ... b_1$, i)
begin
    $X_i = b_h b_{h-1} ... b_{i+1} \bar{b}_i b_{i-1} ... b_2 b_1$;
    if (leaf_node($X_i$) == "true")
        return ($X_i$, $k'_i$);
    $k_i = k_{b_h b_{h-1} ... b_{i+1} \bar{b}_i}$
    else if(internal_node($X_i$) =="true")
        do
            $X_i = X_i 0$;
        while (leaf_node($X_i$) == "false");
        return(Xi, $k'_i$);
    else
        do
            $X_i$ = right_shift($X_i$,1));
        while (leaf_node($X_i$) == "false");
        return ($X_i$, $k'_i$);
end Notes:
1. leaf_node(X) returns true if X is a leaf node of the key distribution tree; false otherwise.
2. internal_node(X) returns true if X is an internal node of the key distribution tree; false otherwise.
3. right_shift (X, i), takes a binary ID $X = b_h b_{h-1} ... b_2, b_1$ and a number, i, as its inputs and right shifts X for i time(s). The output will be $b_h b_{h-1} ... b_{i+1}$.

Figure 5:
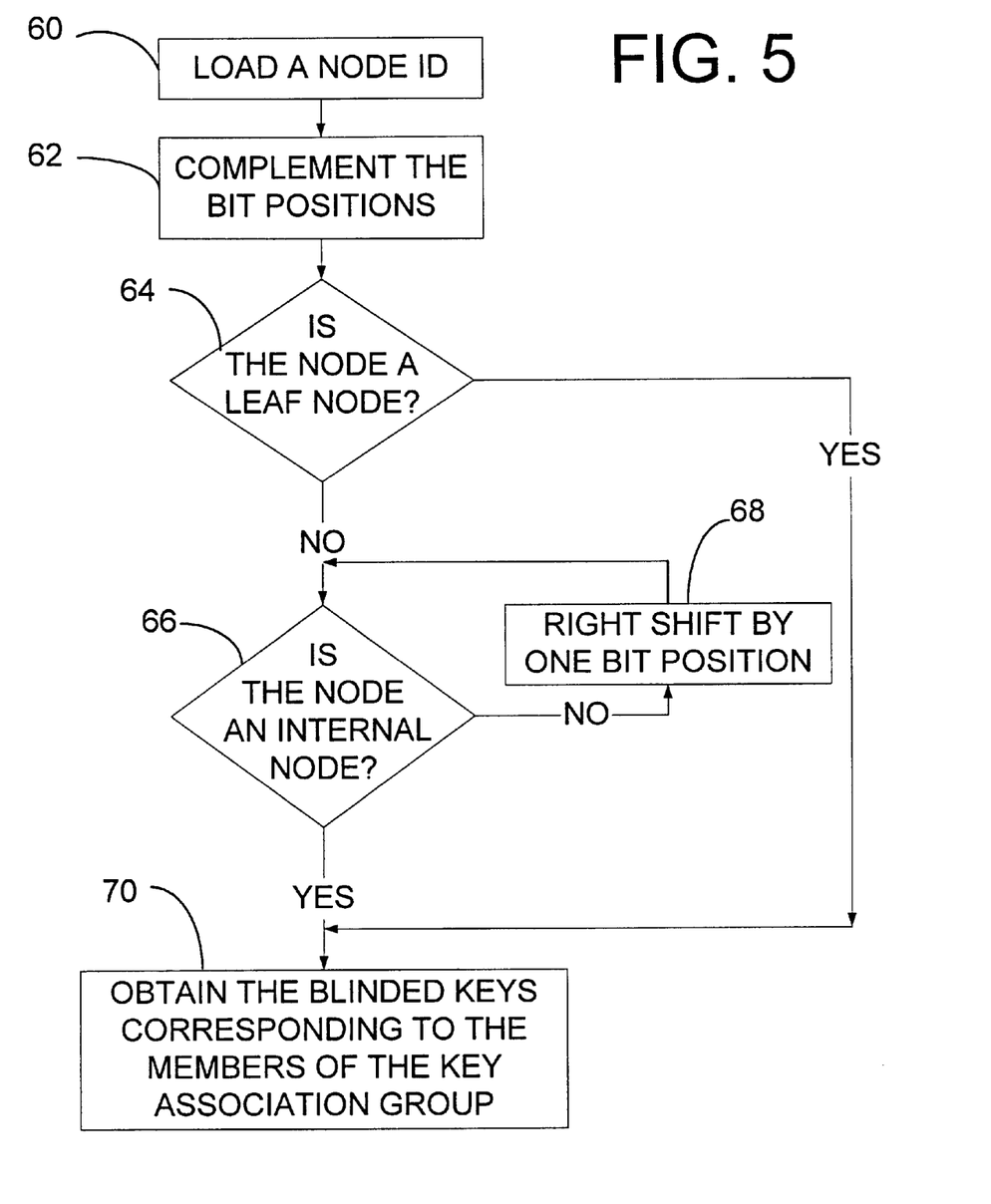
FIG. 5 is a sequence diagram showing a procedure for determining the members of a key association group.

Referring to FIGS. 1, 2 and 5, the key association module 33 applied to H(1110) 40 is illustrated. At step 60, a binary ID 24 corresponding to a node is loaded. The bit positions are then complemented, step 62. Here, we complement the corresponding bit positions 1, 2, 3, 4, and get I(1111) 42, 1100, 1010, 0110. At step 64, if the node is a leaf node, the blinded keys corresponding to the members of the key association group are obtained, step 70. Otherwise if the node is not a leaf node, then at step 66, whether the node is an internal node is determined. Since here, nodes with the last three IDs do not exist, we right-shift them by one bit position to get G(110) 44, F(101) 46, and D(011) 48 as the rest of the members in H's 40 key association group 22a, steps 66 and 68. Finally at step 70, I 42, G 44, F 46, and D 48 supply the keys $k'_{111}$, $k'_{110}$, $k'_{10}$, $k'_0$ respectively, to H 40.

Figure 6:
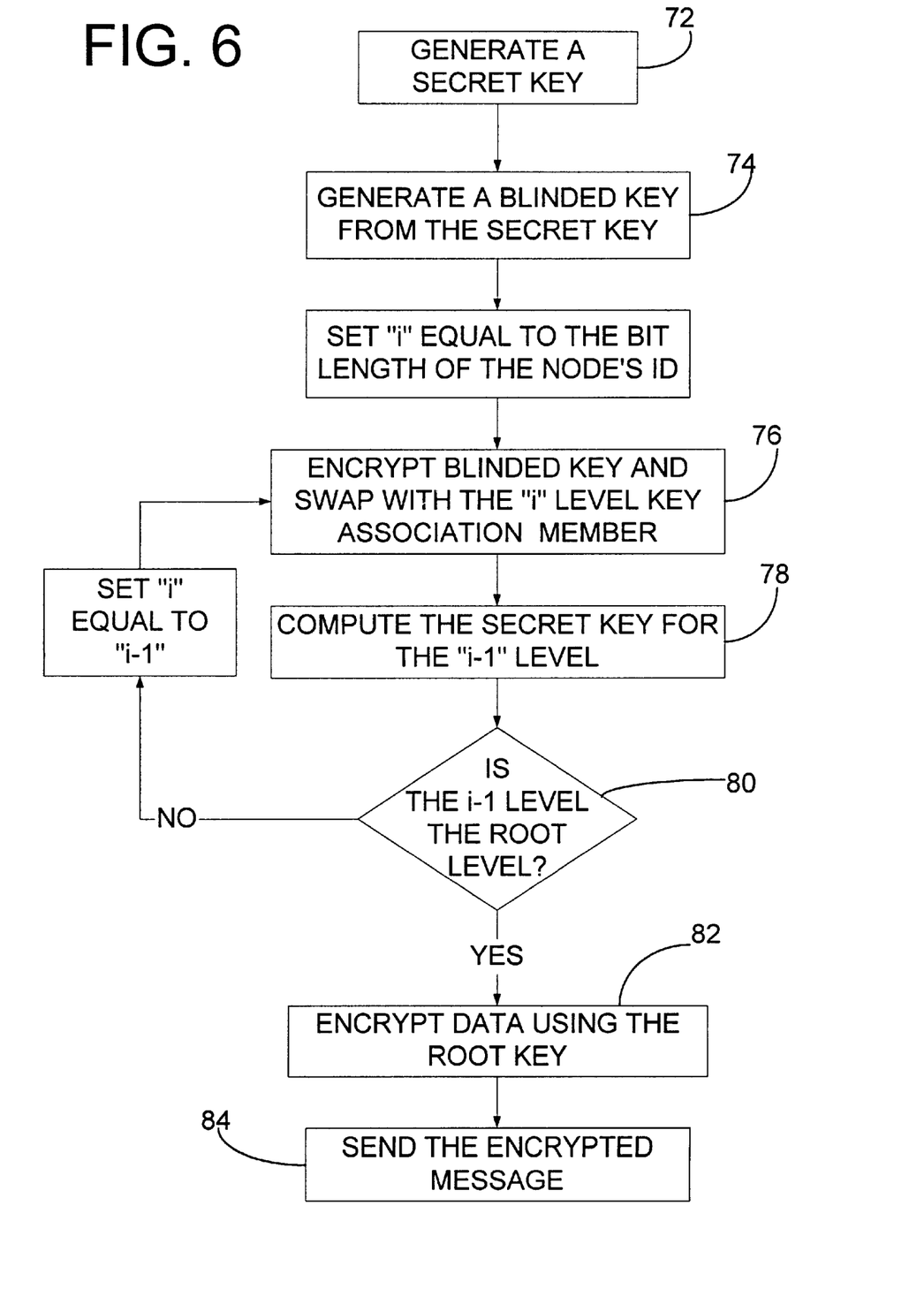
FIG. 6 is a sequence diagram showing a procedure for encrypting data.

Referring to FIGS. 1 and 6, illustrated is the root key computation process for C(010) 50. At step 72, C 50 generates the key $k_{010}$ and sends its blinded version $k'_{010}$ (computed using the given one-way function 32, steps 74 and 76) to D(011) 48. Similarly, D 48 sends $k'_{011}$ to C 50. Both C and D can then individually compute $k_{01}$ by applying the given mixing fiction 34 to $k'_{010}$ and $k'_{011}$. Next, C 50 sends $k'_{01}$ to A(000) 52 and receives $k'_{00}$ in return, step 78. After the key exchange, both A 52 and C 50 can compute $k_0$. After this step, C 50 and G 44 exchange $k'_0$ and $k'_1$ with each other. The root key is computed as a function of $k'_0$ and $k'_1$, step 80. Following similar steps, each member 22 of the multicast group acquires or computes $k_0$ and $k_1$ and then computes the root key. All keys are encrypted with the recipient's public key before transmission. Note that C 50 receives only the blinded keys of the siblings of the nodes in its path to the root 54. Using those keys, it can compute the unblinded keys of the nodes in its path to the root 54. C 50 encrypts a message with the root key that has been computed, step 82. The encrypted message is multicast by C 50 to members 22 of the communications system 20, step 84.

Neighbor-of Set Definition

Each member, X, 22 also maintains a neighbor-of set, $N_x$, which consists of all members for which X is the neighbor. In our example, $N_H$ consists of both G 44 and I 42. Each member 22 monitors the members in its neighbor-of set and initiates ID update and key-update processes when a neighbor leaves. The elements of neighbor-of sets may change during joins or leaves and the join and leave protocols provide information to members to update these sets as well. In the system 20, after a join or leave occurs, during the rekeying process all members 22 recognize the group membership change. Each member 22 is responsible for updating its neighbor-of set using the joining or leaving host's ID 24.

Join Protocol Procedure #1

A prospective member may join at any node of the key distribution tree 26. However, to enhance efficiency it is desirable to control at which node a prospective ember joins in order to keep the key tree balanced. The system 20 locally balances the tree 26 by choosing members 22 in the tree that are within an administratively or Time-to-Live (TTL) scoped area. An example of an administratively scoped area includes limiting a message to a controllably expanded area such as a 5 person LAN, to a department LAN, to a division LAN, to a corporate WAN. An example of a TTL scoped area includes limiting the number of router hops a message may travel. The prospective members join at a local member of the multicast group with the smallest ID length within the scoped area. Undesirable alternative approaches require one or more entities to keep a snap shot of the key distribution tree 26. For example, to keep track of all members 22 of the group and their positions in the key tree 26, either member status report messages are broadcast to the whole group or a centralized entity that keeps track of all joins and leaves. The first alternative creates excessive network traffic and the second has a single point of failure.

Figure 3:
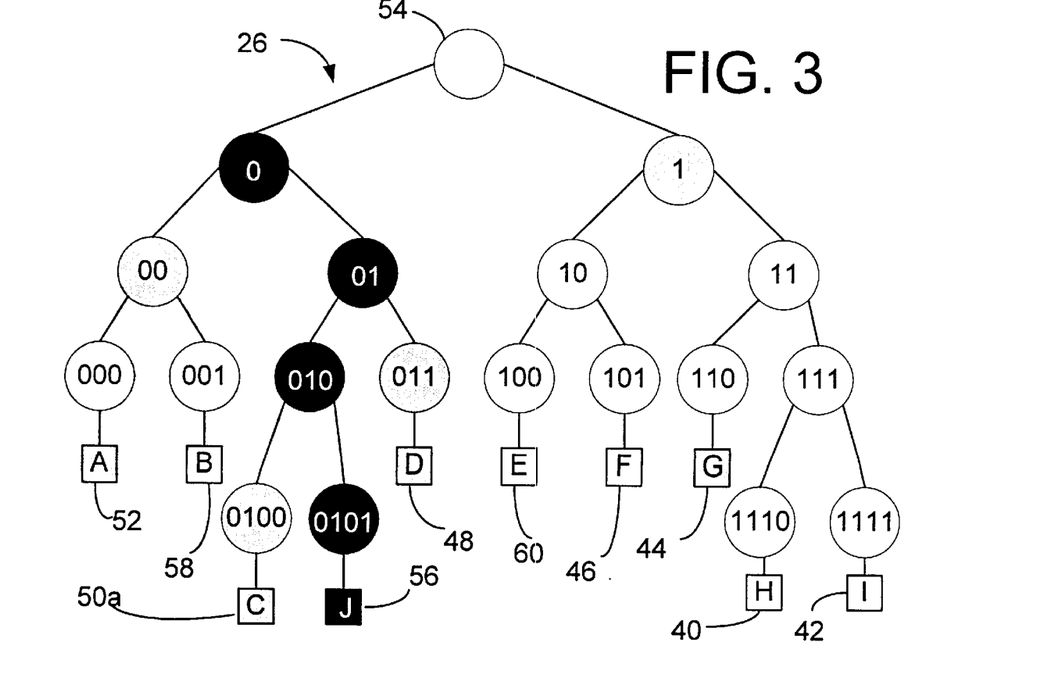
FIG. 3 is a diagram of a member joining a communication system arranged in accordance with the principles of the present embodiment of the invention.
Figure 7:
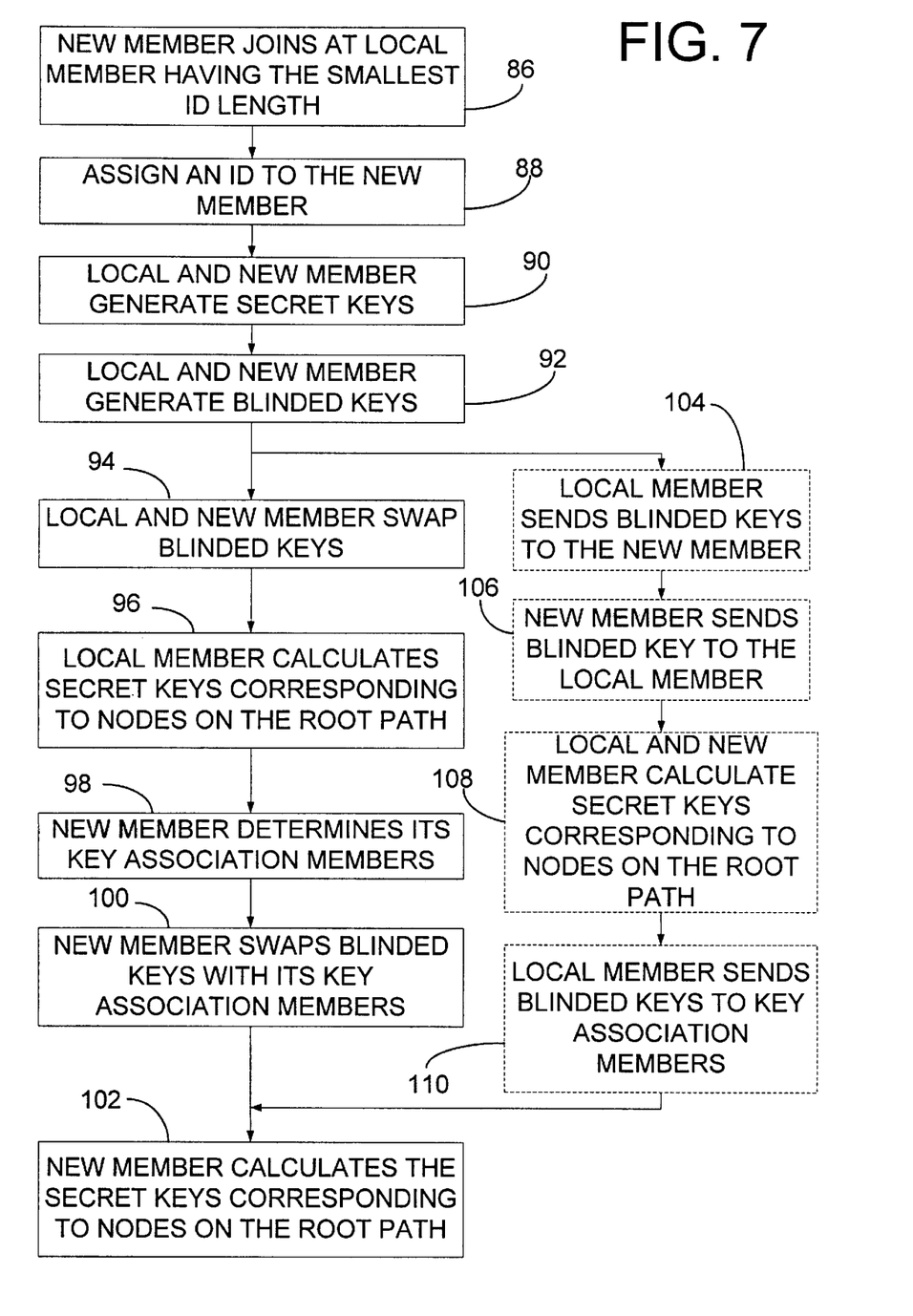
FIG. 7 is a sequence diagram showing a procedure for joining the communication system.
Figure 8:
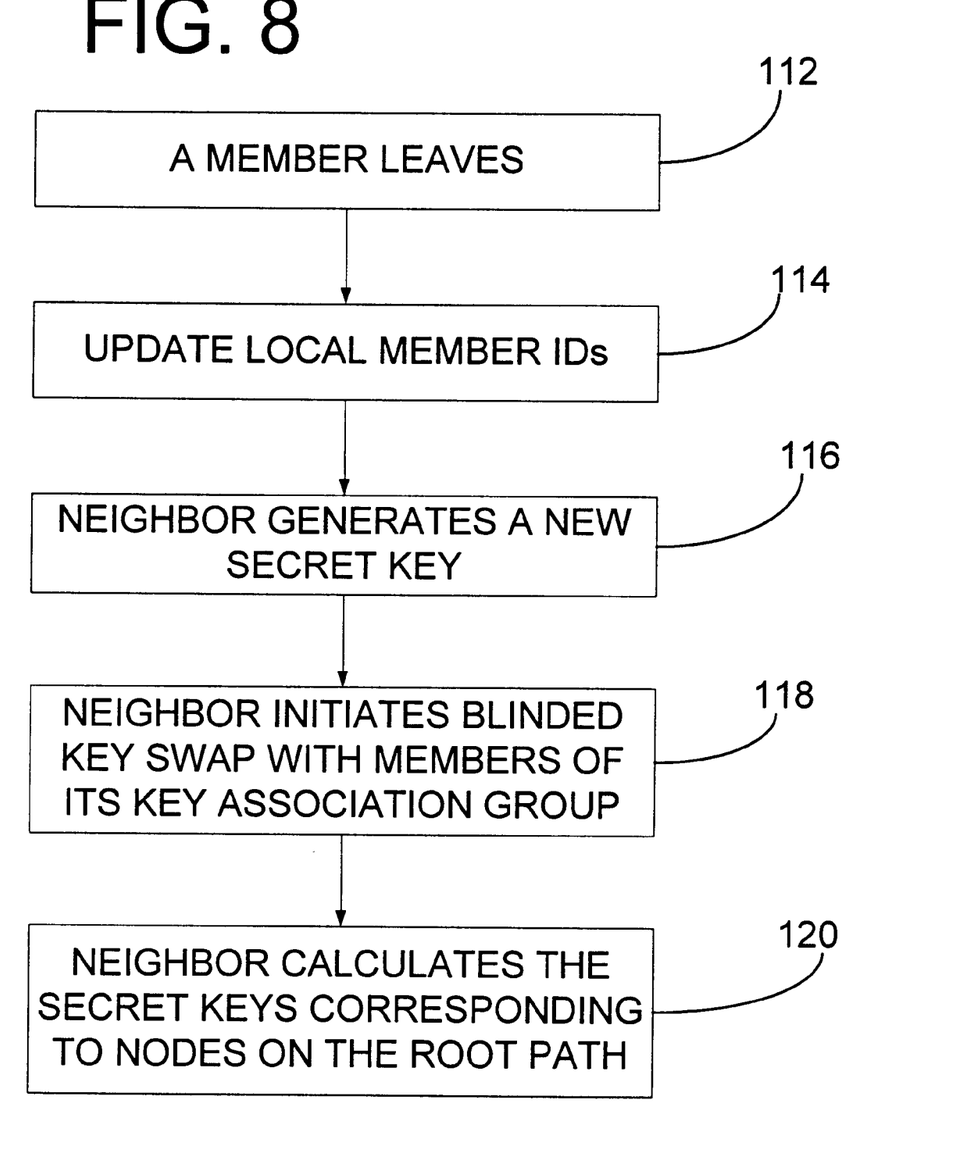
FIG. 8 is a sequence diagram showing a procedure for leaving the communication system.

Referring to FIGS. 1, 3 and 7, J 56 is a new member which joins at C 50, step 86. Upon verifying J's credentials, C splits its ID 010 (shown in FIG. 3), keeps 0100 for itself and assigns 0101 to J 56, step 88. C 50a also changes its secret key 28 and sends the blinded version of its new key to J 56. J 56 generates a secret key 28 of its own and transmits the blinded version to C 50a, steps 90, 92, and 94. Note that all keys corresponding to the internal nodes in the path to the root 54 from J 56, change due to the join. J 56 needs all the unblinded keys of the nodes shown in black and the blinded keys of the nodes show in gray, in FIG. 3. Notice that none of the blinded keys known to C 50a have changed and thus it can compute all the new keys corresponding to nodes 010, 01 and 0 and the root key once it receives k'j, step 96. Now J 56 needs the blinded keys corresponding to 011, 00 and 1. Using the Find_Key_Association() module 33 presented earlier, it determines that nodes with IDs 011(D), 000(A) and 110(G) are the members of its key association group, step 98. Note that these nodes and their neighbors also need the blinded keys that J 56 knows or can compute. To elaborate, J 56 sends $k'_{010}$ to D 48 and receives $k'_{011}$ from D 48. It then computes $k'_{01}$, sends it to A 52, and receives $k'_{00}$ in return, step 100. A 52 is also required to locally multicast $k'_{01}$ encrypted with $k_{00}$, which can only be decrypted by A 52 and B 58. J 56 can now compute $k'_0$ which it sends to G 44, receives $k'_1$ in return and computes the root key for itself, step 102. G 44 multicasts $k'_0$ encrypted with $k_1$, to be decrypted by E 60, F 46, H 40, and I 42 only. After the above key exchanges all authorized members will have the keys they need to compute the new root key. In all, there will be O(log n) unicast messages and O(log n) subgroup multicast messages during a join. Note that the multicast messages will be limited to a TTL-scoped or administratively scoped region, since they only need to be sent to selected subgroups within the multicast group. We generalize the join process in the following Join() module 62. It takes the new member and an existing member's ID 24 as arguments. In the module, k' indicates the key sent by M to X.

TABLE III

Join Module

Join(X, Y = $b_h b_{h-1} \ldots b_1$)/* Y is the existing member */
begin
    Y = $b_h b_{h-1} \ldots b_1 0$;
    X = $b_h b_{h-1} \ldots b_1 0$;
    $k_x$ = generate_new_key();
    i = 1;
    while (i ≤ length(X))
    begin
        (M, k') = Find_Key_Association(X, i);
        outgoing_key = $k'_{\text{right\_shift}(x,i-1)}$;
        send_key_from_to(outgoing_key, X, M);
        scoped_secure_multicast(outgoing_key, M, k);
        send_key_from_to(k', M, X);
        i = i + 1;
        $k_{\text{right\_shift}(x,i-1)}$ = m(outgoing_key, k');
    end Notes:
1. generate_new_key () returns a new secret key.
2. right_shift (X, i), takes a binary ID X = $b_b b_{h-1} \ldots b_2, b_1$ and a number, i, as its inputs and right shifts X for i time(s). The output will be $b_h b_{h-1} \ldots b_{i+1}$.
3. send_key_to (key, X, Y) indicates that X sends "key" to Y.
4. scoped_secure_multicast (key1, X, key2) indicates that X encrypts key1 with key2, and locally multicasts it.
5. length(X) returns the number of bits in the binary ID X.
6. m() is the mixing function, where $k_{bhbh-1\ldots bi+1}$ = m($k'_{bhbh-1\ldots bi+bi}$, $k'_{bhbh-1\ldots bi+1bi}$)

Join Protocol Procedure #2

In another procedure for joining the multicast group, a new member sends a scoped multicast message to members of the multicast group it wants to join. The message consists of the new member's authentication information as well as its unicast (example: IP) address. Referring to FIGS. 3 and 7, C 50 responds to J's 56 request to join, step 86. Upon verifying J's credentials, C splits its ID 010 (shown in FIG. 1), keeps 0100 for itself and assigns 0101 to J 56, step 88. Next, C 50 changes its secret key and sends the blinded version of its new key as well as all the blinded keys it knows (shown in gray in FIG. 3) to J 56. It also sends its unicast address to J 56, since it is J's neighbor, step 104. J 56 generates a secret key of its own and transmits (unicasts) the blinded version to C 50a, step 106. Note that all keys corresponding to the internal nodes (shown in black in FIG. 3) in the path to the root 54 from J 56, change due to the join. Notice that both C 50a and J 56 can compute all the new keys viz., $k_{010}$, $k_{01}$ and $k_0$ and the root key, step 108. The children of the internal nodes 011, 00 and 1 need the blinded keys $k'_{010}$, $k'_{01}$, and $k'_0$. C 50a is responsible for sending them and it uses the keys $k'_{011}$, $k'_{00}$, and $k'_1$ respectively, to encrypt them and sends the encrypted keys via multicast, step 110. Notice that:

C, J and D can decrypt $k'_{010}$,
    A, B, C, J and D can decrypt $k'_{01}$ and
    A, B, . . . , and I can retrieve $k'_0$.

All the above key possessions conform to the key distribution rule that all members know the unblinded keys in their path to root 54 and the blinded keys of the siblings of the nodes in their path to root 54. After the above key exchanges all authorized members will have the keys they need to compute the new root key. In all, there will be a single unicast message consisting of O(log n) keys and O(log n) multicast messages consisting of one key each. Notice that members need to know the unicast addresses of the members in their neighbor-of set. All other keys are sent using the group multicast address. This property contributes to the distributed nature of the protocol. Also, our protocol does not require members to keep ID to unicast address translation tables for all members.

Synchronized Joins

Internal node keys may be updated in several ways. The simplest is to compute an internal node key whenever any one of its children's keys change. However, in the presence of multiple simultaneous joins the simple approach may not work. More precisely, members in different parts of the tree 26 may have different versions of an internal node key, which would thereby render the group inoperable. A method for synchronizing simultaneous joins is therefore desirable.

The first method, a version maintenance approach, for synchronizing simultaneous joins calls for maintaining the version number of all internal node keys. If a member receives two versions of the same key through multicast, it uses the mixing (XOR) function 34 to combine both keys. If more than two versions of the same key are received, the mixing function 34 is applied multiple times to get the new key. Since the XOR function is associative, all members will have computed the same key. A disadvantage of the version maintenance approach is that each key will be associated with some overhead.

An alternative method for synchronizing simultaneous joins calls for using the mixing function 34 to update the internal node keys on all occasions. In other words, new internal node keys are always obtained by applying the mixing function 34 on the old key and the new key received or computed. The second method is more efficient with respect to storage and the first requires less processing time to compute internal node keys.

B. Leave Protocol

When a member 22 leaves, its neighbor initiates the rekeying process. If the neighbor is the departing member's sibling, it assumes its parent's position in the key distribution tree. Otherwise it notifies the descendants of the departing member's sibling to change their IDs. In either case, the neighbor changes its secret key 28 and initiates the rekeying process. It sends the new keys to the members of its key association group and they are responsible for propagating the new keys to the appropriate members in their subgroups. In the rest of this section, we describe the ID update process followed by the rekeying process.

Figure 4:
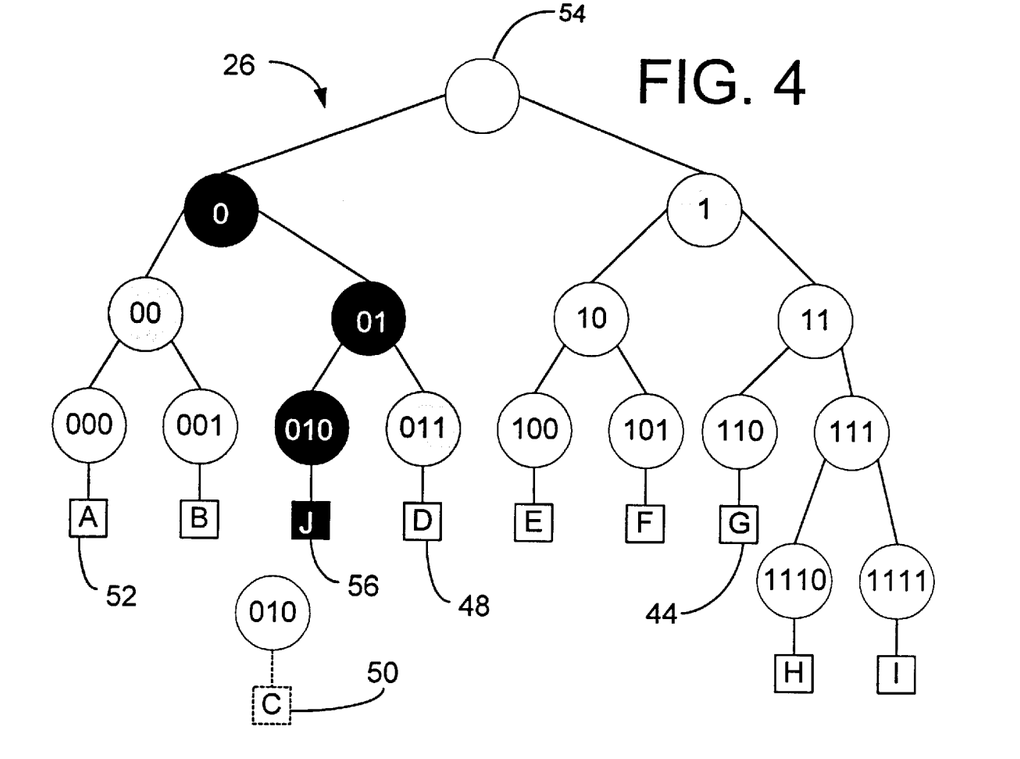
FIG. 4 is a diagram of a member leaving a communication system arranged in accordance with the principles of the present embodiment of the invention.

X is the departing node and Y (=Neighbor(X)) is its neighbor, step 112. If Y has the same ID length as X, Y right shifts its ID by one bit position to get its new ID. If Y's ID is longer than that of X, X's sibling and its descendants change their IDs as follows. Notice that each descendant Z of X's sibling shares a key with X. If Z=$b_h b_{h-1} \ldots b_{i+1} b_i b_{i-1} \ldots b_2 b_1$, then Z's ID after the departure would be $b_h b_{h-1} \ldots b_{i+1} b_{i-1} \ldots b_2 b_1$, where i is the difference in the length of Z's and X's IDs plus one, step 114. In both cases, Y generates the new secret key and initiates the rekeying, step 116. In FIG. 4, if E leaves, F gets the ID 10 and generates a new secret key; if G leaves, H and I get the IDs 110, 111 respectively and H generates the new secret key.

Referring to FIGS. 1 and 4, C 50 leaves the multicast group. J 56 notices the departure and changes its ID from 0101 to 010, and generates a new secret key 28 for itself. Consequently, internal node keys on J's path to the root 54 change and J 56 is responsible for initiating key exchanges with its counterparts, 011(D), 000(A) and 110(G) as defined earlier in this section. J 56 sends the blinded key $k'_{010}$ to D 48. Both J 56 and D 48 can now compute $k_{01}$. J 56 then sends $k'_{01}$, to A 52, which is responsible for sharing it with all members who have $k_{00}$. Finally, J 56 sends $k'_0$ to G 44, which in turn sends $k'_0$ to all the members that have $k_1$. Notice that J 56 does not need any keys in return from D 48, A 52, or G 44, step 118; It already has the blinded keys it needs to compute the root key, step 120. While the departing member C 50 knows all those blinded keys as well, it does not know any unblinded keys it needs and thus cannot compute or acquire the root key. A departure results in O(log n) multicast messages, each message carrying one encrypted secret key. In the following, we provide a generalization of the rekeying process after a member departs from the group.

TABLE IV

Leave Module

```
Leave(X)
begin
    Y = Find_Neighbor(X);
    for each Z in {descendants(sibling(X))} U {Y}
    Z = delete_i^th_bit(Z, length(Z)–length(X)+1);
    k_y = generate _new_key();
    compute_internal_node_keys(Y);
    i = 1;
    while (i ≦ length(Y))
    begin
        (M, k') = Find_Key_Association(Y, i);
        outgoing_key = k'_{right_shift(Y,i–1)};
            right-shift(y,i–1)
        send_key_from_to(outgoing_key, Y, M);
        scoped_secure_multicast(outgoing_key, M, k); /* M already
        has k */,
        i = i + 1;
    end
end
```

Notes:
descendants(X) returns the members of the multicast group that are descendants of
If $X = b_h b_{h-1} \ldots b_2 b_1$, sibling(X) = $b_h b_{h-1} \ldots b_2 \bar{y}_1 X$.
delete_i$^{th}$_bit (X, i), takes a binary ID and an integer as its inputs and returns X with its bit position i deleted. For example if $X = b_h b_{h-1} \ldots b_{i+1} b_i b_{i-1} \ldots b_2 b_1$, the function returns $b z_h b_{h-1} \ldots b_{i+1} b_{i-1} \ldots b_2 b_1$.
generate_new_key () returns a new secret key.
compute_internal_node_keys (Y) indicates that Y locally computes all internal node keys and their blinded counterparts.
right_shift (X, i), takes a binary ID $X = b_h b_{h-1} \ldots b_2, b_1$ and a number, i, as its inputs and right shifts X for i time(s). The output will be $b_h b_{h-1} \ldots b_{i+1}$.
send_key_from_to (key, X, Y) indicates that X sends "key" to Y.
scoped_secure_multicast (key1, X, key2) indicates that X encrypts key1 with key2, and locally multicasts it.
length(X) returns the number of bits in the binary ID X.
m() is the mixing function.

Secure Data Communication

All members in the multicast group can compute the root key with the given keys. A member with data to send, encrypts the data with the root key and sends it via traditional multicast channels (e.g.: MBONE). Other members can decrypt the data without any further key exchanges. The protocol also allows secure subgroup communication. A sender may send secret data to a subgroup of members by encrypting the key it shares with the subgroup.

Group Merge

It is possible to efficiently merge independent communication systems structured in accordance with the principles of the invention to form a single many-to-many multicast group. To merge two groups that are of approximately equal size, we compute a new common group key by applying the mixing function 34 to the existing root keys. Members with IDs 1$^+$(example: 1, 11, 111 etc.)or IDs 0$^+$(example: 0, 00, 000 etc.) may act as default representatives of a group and initiate the group merge. If one of the groups is substantially shallower than the other group, the shallower group joins at the shallowest point of the deeper tree. Such a group join is similar to a join and the member 22 with ID 0$^+$(or 1$^+$) changes its secret key and initiates the rekeying.

Network Partitions and the Group Leave Operation

Neighbors may notice network partitions by following a repeated discovery process. For example, when a members neighbor does not send a heartbeat message, the corresponding member 22 may assume that the neighbor is not available or the member may initiate a discovery process to see whether others in the subgroup are available. Subgroup multicast addresses may be used for this discovery process.

Note that members of each subtree in the key tree can communicate within themselves using the blinded key of the internal node they have in common. Thus, in case of network partitions, it is possible for all connected subgroups to communicate within themselves.

Balancing the Key Tree

The key tree should be balanced for efficient secret key distribution. The use of smart join algorithms prevents the formation of an unbalanced tree. The join protocol calls for prospective members to join at an existing sender that has the smallest ID length. However, since requests for joins are sent to senders in a scoped (local) area, we may not have a globally balanced tree. Also, a series of leaves may result in an unbalanced tree. It is possible to re-balance the tree by forcing a group leave and group merge operation. Using smart selection of a location for group merge, we may reconstruct a balanced tree.

Few-to-many Secure Group Communication

An alternative embodiment of the invention provides secure few-to-many group communication. A class of multicasting applications have a small set of members, the senders, sending the data and the others, the receivers, receiving the data. All of the senders are also receivers. Panel discussions multicast over the Internet, online corporate meetings where branch managers discuss strategy while other employees listen in are examples of few to many group communication. Some of the applications discussed above also require secrecy of data for acceptable use. In designing a trust model, it is apparent since the senders own the data, they must have control over the multicast group. In our context, control consists of group access control, secret key distribution etc. It is desirable that the senders have equal control, are trusted equally, and also bear an equal share of the protocol processing overhead.

Subgroups

Figure 9:
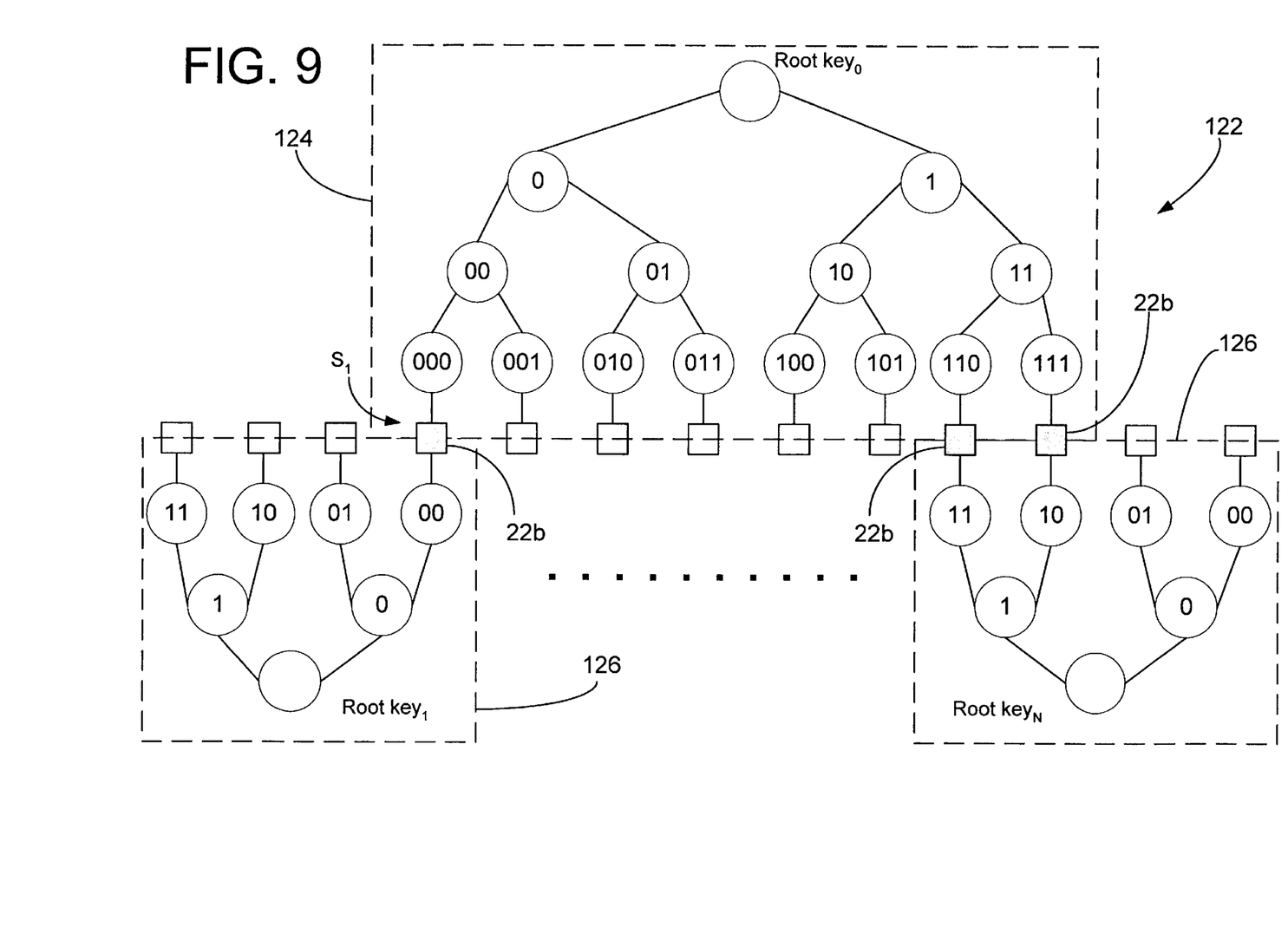
FIG. 9 is a diagram illustrating a communication system for few to many communication among members of a communication group.

Referring to FIG. 9, a few-to-many communication system 122 adhering to the principles of the present invention is illustrated. The senders belong to a senders subgroup 124 sharing a common group key (Root Key$_0$) and employing the principles of the invention. Rekeying during joins and leaves is identical to that of the embodiment for many-to-many communication. The receivers form n receivers subgroups 126; members of a receivers subgroup 126 share a common group key (Root Key$_I$, $1 \leq I \leq n$) among themselves and also employ the principles of the invention. Using the corresponding root key each subgroup member 22 can communicate with other members of the same subgroup.

Each subgroup of receivers has at least one sender as a member 22b as shown in FIG. 9. In other words some senders belong to two subgroups, the group of the senders and one of the groups of the receivers. The sender 22b that is part of a receivers' subgroup is responsible for group control of that subgroup. Note that group management overhead however is distributed among all the members of the receivers' subgroup, following the principles of the invention.

Few-to-many Group Formation

A few-to-many group may form in a number of different ways. For example, the senders first form the senders subgroup 124. Some of the senders may then begin to accept requests for membership from the receivers and form receivers' subgroups 126. Our protocol also allows for limited data transmission by some of the receivers. When a receiver wants to send data, it contacts the sender that controls the subgroup it belongs to. If the sender approves the data transmission by the receiver, it forwards it to all the members of the few-to-many group 122.

Alternatively, receivers subgroups 126 may be formed first and then leaders from the subgroups form the senders' subgroup 124 to initiate few-to-many communication. Corporate meetings are examples of such few-to-many groups. For example if ABC corporation has several branches M, N, . . . , Z, each branch location first forms the receivers subgroups 126. Managers (leaders) from each group then form the senders subgroup 124 and start few-to-many group communication.

Secure Communication

Each sender generates a session key and sends data encrypted with it to the few-to-many group. It then forwards the session key encrypted with Root Key$_0$ to the senders' subgroup 124. Each sender 22b that is member of a receivers' subgroup 126 decrypts the session key, encrypts it with the receivers' subgroup key and forwards it. In FIG. 9, $S_1$ decrypts the session key using Root Key$_0$ and encrypts it using Root Ke$_1$. The use of a randomly generated session key for data transmission ensures that the receivers cannot send data.

Alternatively, it is possible to use the senders' subgroup key, Root Key$_0$ for data transmission. In that case, multicast routers need to filter any data sent by the receivers.

While the invention has been described in its presently preferred embodiment, it will be understood that the invention is capable of modification or adaptation without departing from the spirit of the invention as set forth in the appended claims.

What is claimed is:

1. A distributed group key management system for providing secure communication between a plurality of members, comprising:
   a binary distribution tree for defining a communication structure including an internal node having a first branch and a second branch depending therefrom, said internal node having a blinded key and an unblinded key, each of said branches including a first member assigned to a corresponding leaf node, said first member being associated with a key association group comprised of at least one other member;
   said first member including;
      a unique binary ID associated with the corresponding leaf node to which the first member is assigned;
      a first secret key for contributing to the generation of the internal node blinded key; and
      a blinded key derived from said first secret key for exchanging with a blinded key of the at least one other member;
   wherein said first member uses the blinded key of the at least one other member and the first member first secret key to calculate an unblinded key of the first internal node to be used for encrypting data that is communicated between members located on branches depending from the first internal node.

2. The distributed group key management system of claim 1 wherein said first member further includes a secret key generator for generating said first member first secret key.

3. The distributed group key management system of claim 1 wherein said first member further includes a key association group module for determining the key association group associated with the first member.

4. The distributed group key management system of claim 1 wherein said first member further includes a blinded key module for generating the first member blinded key from the first member first secret key.

5. The distributed group key management system of claim 4 wherein the blinded key module includes a one way function for generating the first member blinded key.

6. The distributed group key management system of claim 1 wherein the first internal node is a root node.

7. The distributed group key management system of claim 1 wherein said first member further includes:
   a key association group module for determining the key association group associated with the first member;
   a secret key generator for generating the first member first secret key; and
   a blinded key module for generating the first member blinded key from the first member first secret key.

8. The distributed group key management system of claim 1 wherein said second branch includes a first member that is a member of the key association group associated with the first branch first member; and
   the first member further includes an unblinded key module having a mixing function for determining the unblinded key of the first internal node from the blinded key of the first branch first member and the blinded key of the second branch first member that is a key association group member associated with the first branch first member.

9. The distributed group key management system of claim 1 wherein said first member further includes;
   a key association group module for determining the key association group associated with the first member;
   a secret key generator for generating the first member first secret key; and
   a blinded key module having a one way function for generating the first member blinded key from the first member first secret key; and
   an unblinded key module having a mixing function for determining the unblinded key of the first internal node.

10. A method of providing secure communications between at least two present members, comprising the steps of:

providing a binary tree having at least one internal node and at least two leaf nodes, one of said internal nodes being a root node, each of said internal nodes having two branches extending therefrom, a first branch ending at one of said leaf nodes and another branch ending at another of said leaf nodes, a root path extending from each of said leaf nodes to said root node;

assigning each of said present members to said leaf nodes, whereby each of said present members has a root path extending from a leaf node to said root node;

assigning a binary ID to said internal nodes and leaf nodes;

associating a secret key and a blinded key with each of said leaf nodes, wherein the blinded key is derived from the secret key;

determining a key association group that is associated with a present member for dividing key distribution tasks, the key association group including a group node corresponding to each internal node in the root path of the present member, each group node having an associated member, said present member being assigned to a leaf node in the first branch of said root path internal node, each associated member being assigned to a leaf node in the other branch of said root path internal node;

the present member sending to the associated member of the key association group a blinded key associated with the group node in the first branch of the root path internal node;

the key association group associated member sending to the first member a blinded key associated with the group node in the other branch of the root path internal node;

determining an unblinded key of the root path internal node from the blinded key associated with the other branch group node and the blinded key associated with the first branch group node;

encrypting data with the root path internal node unblinded key; and communicating the encrypted data between members located on branches depending from the root path internal node.

11. The method of claim 10 wherein the step of associating a secret key further comprises generating the secret key.

12. The method of claim 10 wherein the step of associating a secret key further comprises generating the blinded key from the secret key using a one way function.

13. The method of claim 10 wherein the steps of sending further include using a secure channel.

14. The method of claim 13 wherein the step of using the secure channel further includes using a public key to encrypt the blinded key of the present member and the blinded keys of the associated members.

15. The method of claim 10 wherein the step of determining the root path internal node unblinded key further includes applying a mixing function to the blinded key associated with the second branch node and the blinded key associated with the first branch node.

16. The method of claim 10 further comprising the step of removing a leaving member from the binary tree.

17. The method of claim 16 wherein the step of removing includes the steps of:

updating the binary ID of the present members;

generating a new secret key for a neighbor of the leaving member, wherein the neighbor is the present member located next to the leaving member, said neighbor having a root path and a key association group including at least one associated member;

initiating a swap of blinded keys between the neighbor and the associated member of the key association group of the neighbor, wherein the neighbor initiates the key swap; and determining the unblinded keys of the internal nodes on the root path of the neighbor.

18. The method of claim 10 further comprising the step of joining a new member to the binary tree.

19. The method of claim 18 wherein the step of joining further comprises:

sending a request to join from the new member to a local member of said present members;

granting the request to join;

splitting the binary ID of the local member into a first ID and a second ID, wherein the first ID is assigned to the local member and the second ID is assigned to the new member;

generating a new secret key for the local member;

generating a first secret key for the new member;

generating a blinded key of the local member from the new secret key;

generating a blinded key of the new member from the first secret key;

exchanging the blinded key of the new member with the blinded key of the local member;

determining a key association group that is associated with the new member for dividing key distribution tasks, the new member key association group including a group node corresponding to each internal node in the root path of the new member, said new member being assigned to a leaf node in the first branch of said root path internal node, said group node having an associated member, each associated member being assigned to a leaf node in the other branch of the root path internal node of the new member;

the new member sending to the associated member of the new member key association group a blinded key associated with a first node in the first branch of the root path internal node;

the new member key association group associated member sending to the new member a blinded key associated with the group node in the other branch of the root path internal node; and determining an unblinded key of the new member root path internal node from the blinded key associated with the new member other branch group node and the blinded key associated with the new member first node.

20. A method of joining a new member to a distributed communications system for secure communications between a plurality of local members, comprising the steps of:

providing a binary tree having at least one internal node and at least two leaf nodes, one of said internal nodes being a root node, each of said internal nodes having two branches extending therefrom, a first branch extending to at least one of said leaf nodes, and a second branch extending to at least another of said leaf nodes, a root path extending from each of said leaf nodes to said root node; each of said local members having a binary ID, and being assigned to a leaf node;

sending a request to join from a new member to one of said local members of the communications system;

determining a key association group that is associated with the local member for dividing key distribution tasks, the local member key association group including a group node corresponding to each internal node in the root path of the local member, said local member being assigned to a leaf node in the first branch of said root path internal node, said group node having an associated member, each associated member being assigned to a leaf node in the other branch of the root path internal node of the local member;

granting the request to join;

splitting the binary ID of the local member into a first ID and a second ID, wherein the first ID is assigned to the local member and the second ID is assigned to the new member;

generating a local member new secret key;

generating a new member first secret key;

generating a local member blinded key from the local member new secret key;

generating a new member blinded key from the new member first secret key;

sending the new member blinded key to the local member;

sending the local member blinded key to the new member;

calculating the blinded key and the unblinded key of the local member root path internal node;

sending the local member root path internal node blinded key to the local member key association group associated member corresponding to the group node corresponding to the local member root path internal node;

sending a blinded key of the group node corresponding to the local member root path internal node to the local member; and forwarding the group node blinded key corresponding to the local member root path internal node to the new member.

21. The method of claim 20 wherein the step of sending the new member blinded key further comprises unicasting the blinded key of the new member to the local member.

22. The method of claim 20 wherein the step of sending the group node blinded key further comprises unicasting the group node blinded key to the local member.

23. The method of claim 20 wherein said internal nodes further include a blinded key further comprising the steps of:

maintaining a version associated with the blinded key of the internal node;

receiving the blinded key of the internal node;

determining whether more than one version of the internal node blinded key has been received; and using a mixing function to combine the versions of the internal node blinded key.

24. The method of claim 20 wherein each of said internal nodes further includes an old blinded key, further comprising the steps of:

receiving a new blinded key corresponding to an internal node; and applying a mixing function to the old blinded key and the new blinded key.

25. The method of claim 20 wherein the binary ID includes a length, further comprising the step of:

determining the present member having the binary ID with the shortest length; wherein the binary ID of the present member with the shortest length binary ID is split into the first ID and the second ID.

26. A method of merging a first secure communications system with a second secure communications system, each of said communications systems including a plurality of members having a binary ID, each of said communications systems having a binary tree structure with a root node, said root node having a blinded key, comprising the steps of:

sending a request to merge the first communications system with the second communications system;

granting the request to merge;

using a mixing function to combine the blinded key of the first communications system root node with the blinded key of the second communications system root node;

appending a 1 to the binary ID of said first communications system plurality of members; and appending a 0 to the binary ID of each member of the second communications system.

27. A distributed group key management system for providing secure communication between a plurality of members, comprising:

at least one sender binary distribution tree for forming a senders group;

said at least one sender binary distribution tree defining a communication structure having a sender internal node with a first branch and a second branch depending therefrom, each of said branches including a first member assigned to a corresponding leaf node, said first member being associated with a key association group including at least one other member;

said senders group first member including:

a unique binary ID associated with the corresponding leaf node to which the senders group first member is assigned;

a first secret key; and a blinded key derived from said first secret key for exchanging with a blinded key of the other senders group member;

wherein said senders group first member uses the blinded key of the at least one other senders group member and the first secret key to calculate an unblinded key of the sender internal node to be used for encrypting and decrypting sending group data that is communicated between sending group members located on branches depending from the sender internal node; and at least one receiver binary distribution tree for forming a receivers group, said receivers group including at least one sender for communicating with said senders group;

said at least one receiver binary distribution tree defining a communication structure having a receiver internal node with a first branch and a second branch depending therefrom, each of said branches including a first member assigned to a corresponding leaf node, said first member being associated with a key association group including at least one other member;

said receivers group first member including;

a unique binary ID associated with the corresponding leaf node to which the receivers group first member is assigned;

a first secret key operable for encrypting data; and a blinded key derived from said first secret key for exchanging with a blinded key of the other receivers group member;

wherein, each of said senders is one of said senders group first members and one of said receivers group first members, said sender uses the blinded key of the other receivers group member and the first secret key of the sender to calculate an unblinded key of the receiver internal node to be used for encrypting and decrypting receivers group data that is communicated between said receivers group members located on branches depending from the receiver internal node.

28. The distributed group key management system of claim 27 wherein the receivers group data and the senders group data is a session key for decrypting second data that is encrypted with the session key.

29. The distributed group key management system of claim 27 wherein the receivers group data and the senders group data is communications data for communicating between senders group members and receivers group members.

* * * * *